United States Patent Office 3,145,889
Patented Aug. 25, 1964

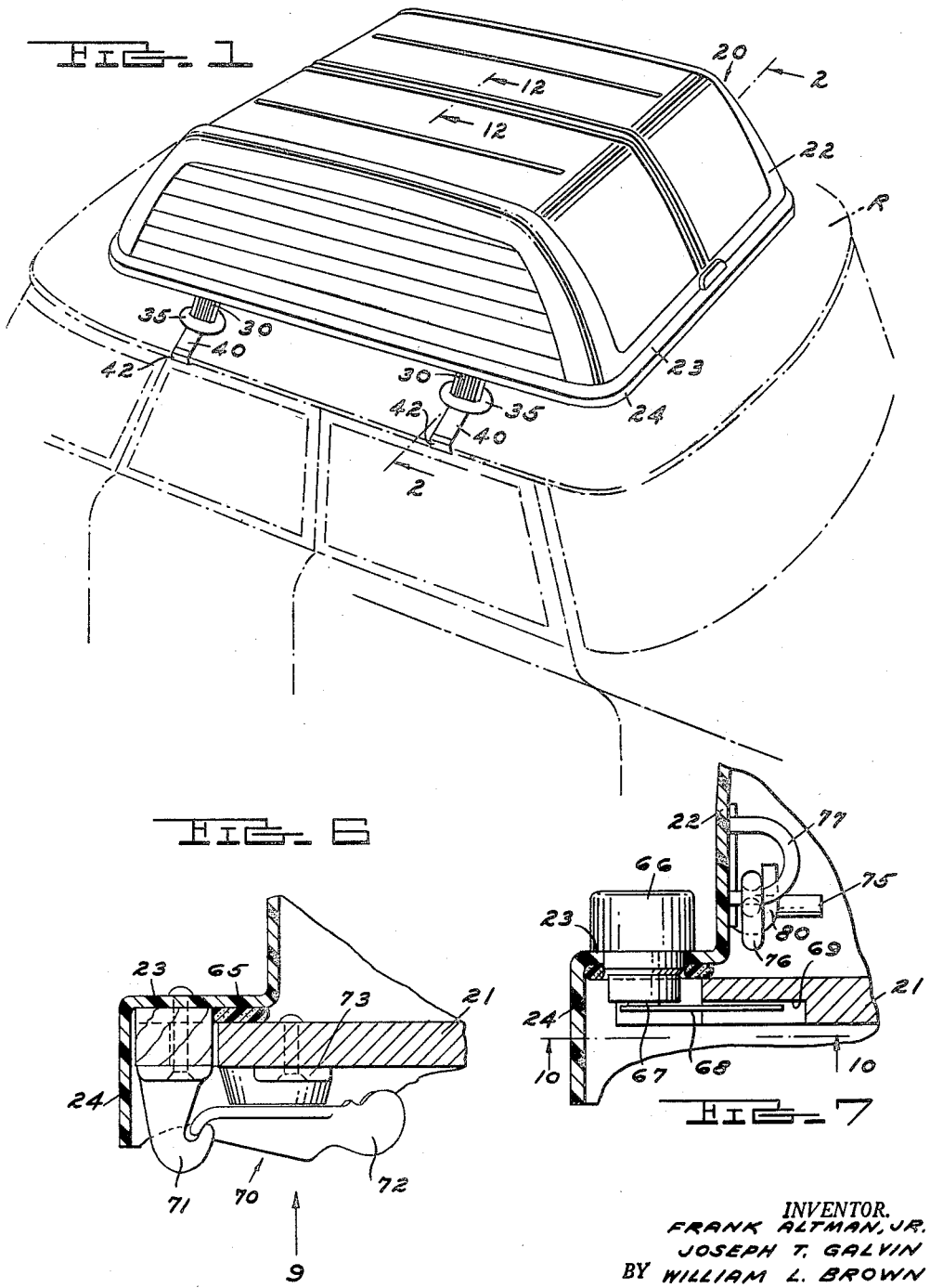

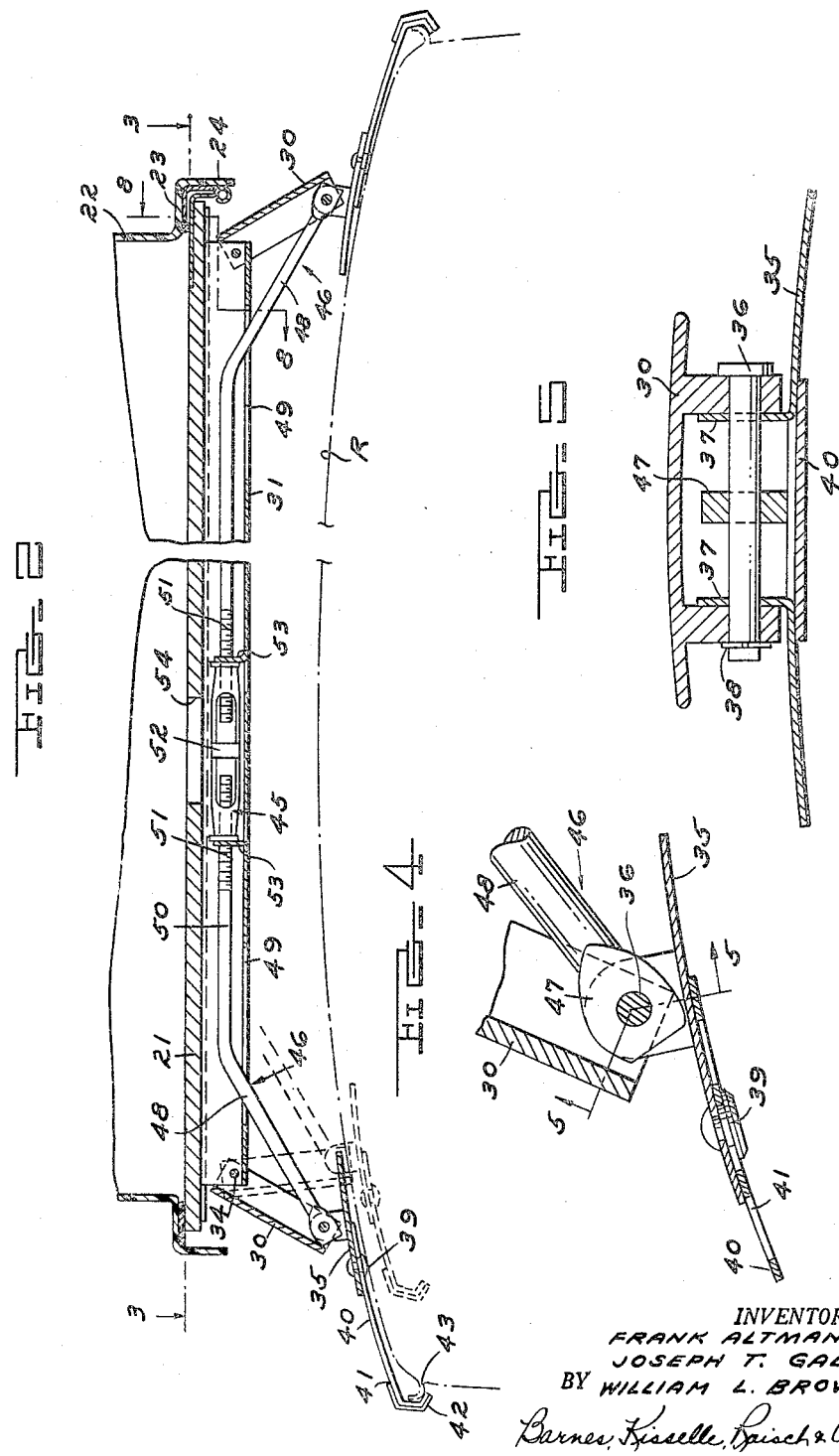

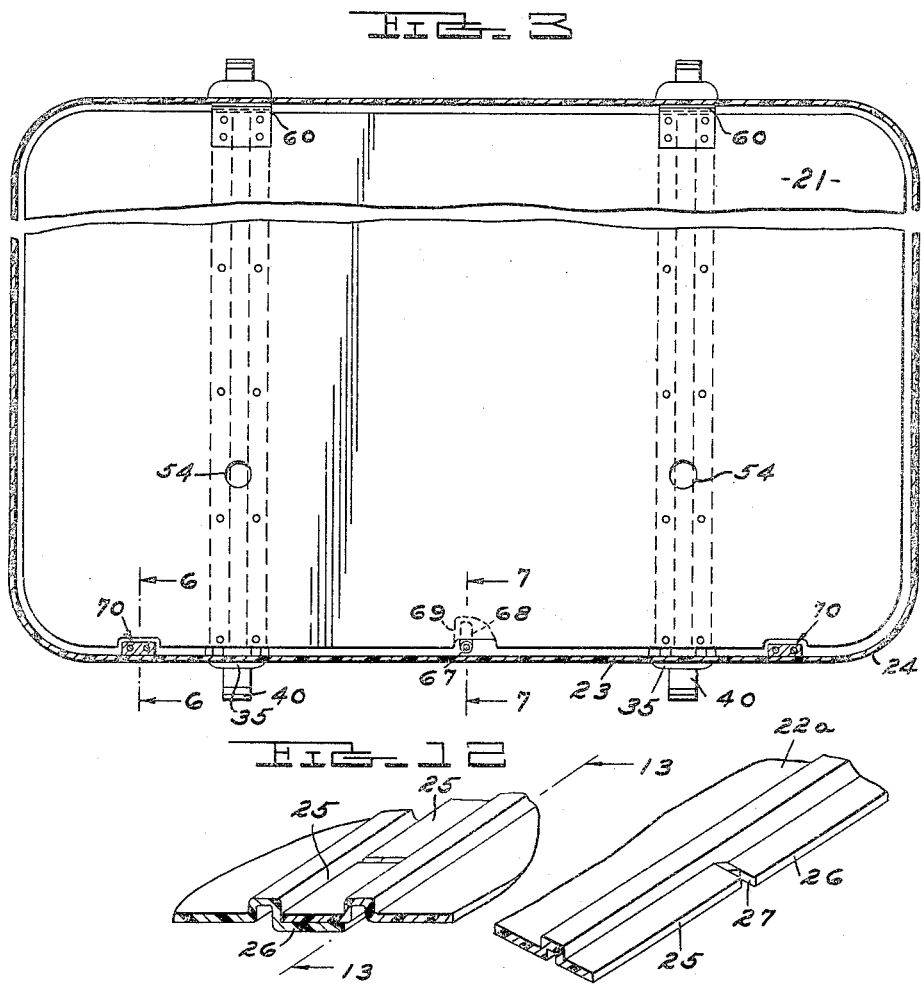

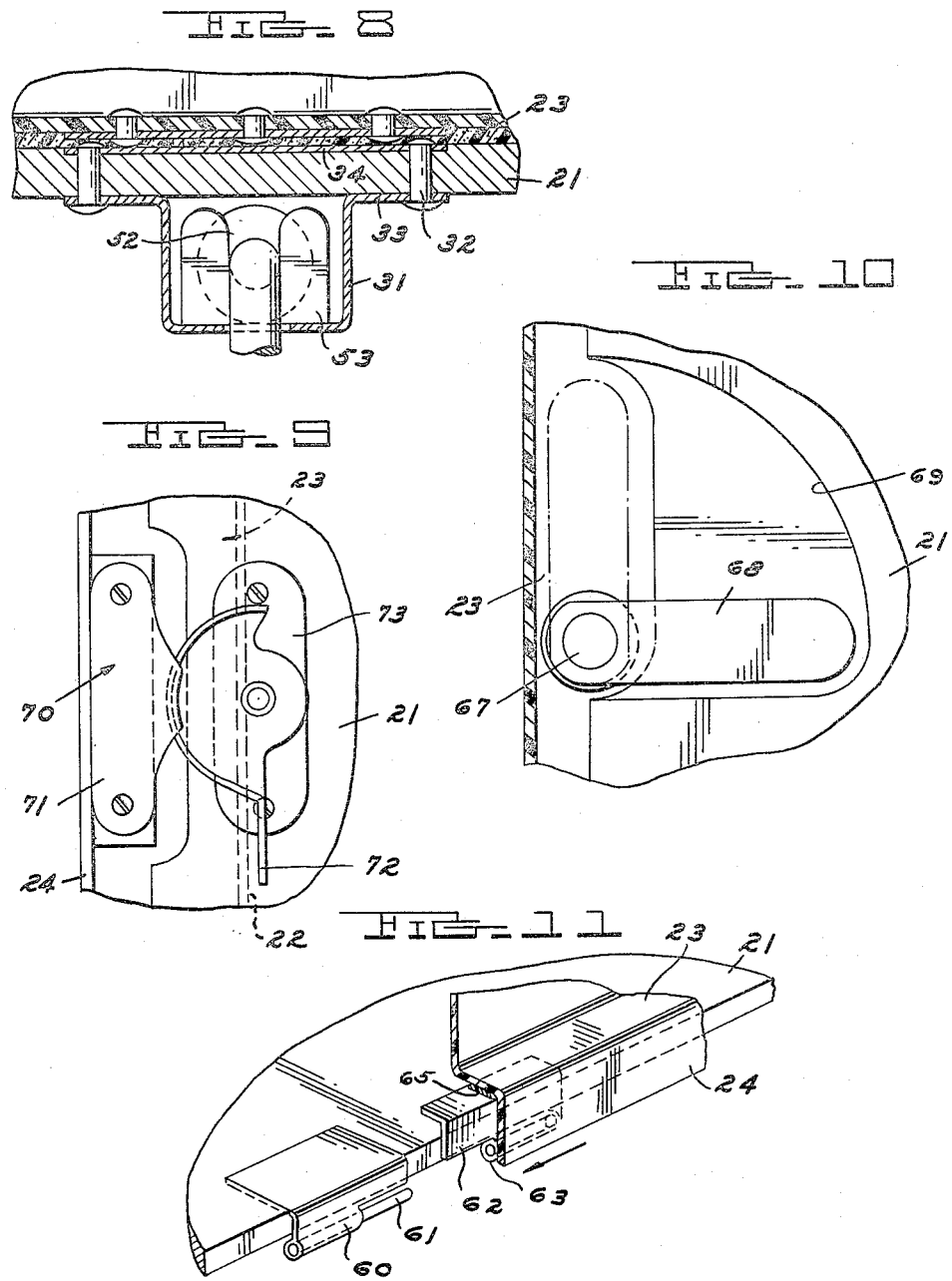

3,145,889
CAR TOP LUGGAGE CARRIER
Frank Altman, Jr., and Joseph T. Galvin, Dearborn, and William L. Brown, Garden City, Mich., assignors, by mesne assignments, to Structurlite Plastics Corporation, Hebron, Ohio, a corporation of Ohio
Filed Jan. 11, 1961, Ser. No. 81,992
4 Claims. (Cl. 224—42.1)

This invention relates to a luggage carrier of the type which is removably mounted on a car top.

It is an object of this invention to provide an enclosed car top carrier that is removably mounted on the top of an automobile; which carrier is water, weather and dust proof; which carrier is theft proof; which includes a removable cover or closure; which is of light weight and can be readily mounted and removed from the car top; and which can be manufactured at low cost.

Basically, the car top carrier comprises a flat platform having a hollow shell or cover hinged thereto along one edge. The cover is locked in position on the platform. The platform is supported on the roof by pivoted legs. The lower end of each leg is pivoted to a pad which rests upon the car roof and it is held in place by a strap which hooks under the roof gutter of the car roof. The pad on one side of the car is connected to the pad on the opposite side of the car by a turnbuckle and rod assembly that is accessible only from the interior of the carrier through an opening in the platform. By rotating the turnbuckle, the rods extending from the legs are drawn toward each other pulling the hooks on the straps of the pads tightly into engagement with the roof gutter.

In the drawings:

FIG. 1 is a perspective view of a car top carrier embodying the invention showing the carrier in position on a car top, the car being shown in broken lines.

FIG. 2 is a fragmentary sectional view taken along the line 2—2 in FIG. 1.

FIG. 3 is a fragmentary sectional view taken along the line 3—3 in FIG. 2.

FIG. 4 is a fragmentary sectional view on an enlarged scale of a portion of the carrier shown in FIG. 2.

FIG. 5 is a fragmentary sectional view taken along the line 5—5 in FIG. 4.

FIG. 6 is a fragmentary sectional view taken along the line 6—6 in FIG. 3.

FIG. 7 is a fragmentary sectional view taken along the line 7—7 in FIG. 3.

FIG. 8 is a fragmentary sectional view taken along the line 8—8 in FIG. 2.

FIG. 9 is a fragmentary view taken in the direction of the arrow 9 in FIG. 6.

FIG. 10 is a fragmentary sectional view taken along the line 10—10 in FIG. 7.

FIG. 11 is a fragmentary part sectional perspective view showing the process of assembly of the cover to the platform of the carrier.

FIG. 12 is a fragmentary sectional perspective view taken along the line 12—12 in FIG. 1.

FIG. 13 is a fragmentary sectional view taken along the line 13—13 in FIG. 12.

FIG. 14 is a fragmentary perspective view of a portion of the cover shown in FIG. 12.

FIG. 15 is a perspective view showing the cover in open position on the carrier.

Referring to FIGS. 1 and 2, the car top luggage carrier 20 embodying the invention comprises a flat platform or base 21 and a hollow shell or cover 22 hinged thereto along one longitudinal edge so that it can be swung to an open position such as shown in FIG. 15. The cover 22 is of hollow shape so that when it is closed on the platform 21 an enclosed storage space is provided for luggage, golf clubs and the like.

The platform 21 is made of a piece of flat light-weight material such as plywood while the cover 22 is made of a light-weight weather and waterproof material such as plastic. A satisfactory cover comprises sisal impregnated with a polyester resin.

As shown in FIG. 2, the cover 22 includes an outwardly extending peripheral flange 23 and a downwardly extending peripheral lip 24 that overlaps the periphery of the platform 21. Cover 22 is made up of two identical halves which are joined together along a longitudinal seam. As shown in FIGS. 13 and 14, each half 22a includes longitudinal edges 25, 26 separated by a notch 27 and displaced relative to one another. Thus, when the two halves are brought together as shown in FIGS. 12 and 13, the notches 27 interengage and the corresponding edges 25, 26 overlap. The two halves are fastened together by suitable means such as rivets or adhesive.

The platform 21 of the luggage carrier is supported on the roof R of the car by pivoted legs 30, the number of legs being preferably four, two on each side of the carrier and the car. The upper ends of each pair of legs 30 on opposite sides of the car are pivoted to a transverse channel 31 which is fixed to the underside of the platform 21 by rivets 32 extending through the flanges 33 of the platform 21 and through reinforcing plates 34 on the top surface of the platform 21. Each channel 31 is generally U-shaped as further shown in FIG. 8. As shown in FIG. 2, each leg 30 is also generally U-shaped and is pivoted to the end of channel 31 by a pin 34 at its upper end. The lower end of each leg 30 is pivoted to a pad 35 by a pin 36 extending through upwardly extending tabs 37 on the pad and held in position by a C-shaped lock washer 38 (FIG. 5). Each pad 35 is, in turn, fastened to the roof by having a rivet 39 thereon which selectively engages one of a plurality of holes 40 in a strap 41. Each strap 41 is formed with a hook 42 that engages under the roof gutter 43 (FIGS. 3 and 4).

Leg 30 on one side of the carrier is connected to the leg 30 on the opposite side of the carrier by a turnbuckle and rod assembly 45 that comprises rods 46. Each rod 46 has its end flattened as at 47 with the pin 36 extending therethrough at the lower end of its respective leg 30. Each rod is bent intermediate it sends so that a portion 48 thereof extends upwardly through an opening 49 into the interior of channel 31 and a second portion 50 extends along the channel. The end 51 of each rod 46 is threaded and engaged by a turnbuckle nut 52. When the turnbuckle nut 52 is tightened, the rods 46 are pulled inwardly drawing the legs 30 and, in turn, the pads 35 toward each other to pull the straps 41 and the hooks 42 tightly into engagement with the underside of the roof gutters 43. As shown in FIG. 8, tabs 53 struck upwardly from the base of channel 31 maintain each nut 52 in position longitudinally of the channel 31 and under an access opening 54 in the platform 21. Access may be had to the turnbuckle 52 from the top side of the platform 21 only after opening the interior of cover 22. Thus, when the cover 22 is closed and locked in position, as presently described, the turnbuckle assembly 45 cannot be reached and therefore the carrier cannot be removed from the top of the car.

The cover 22 is preferably removably hinged to the platform 21. As shown in FIG. 11, such an arrangement comprises an axially disengageable pin-type hinge including a hinge member 60 mounted on the platform 21 and a hinge member 62 mounted on the underside of the flange 23 and lip 24. Hinge member 60 has a pin 61 adapted to engage an opening 63 in hinge member 62. As shown in FIG. 3, a pair of such hinges preferably are provided along the longitudinal edge of the platform 21.

In order to provide a moisture, dust and weather-proof seal between the periphery of the cover 22 and the platform 21, a sealing strip 65, preferably of foam plastic such as foam polyurethane, is adhered to the underside of the peripheral flange 23 and is adapted to engage the periphery of the top surface of the platform 21 (FIGS. 2, 6, 7 and 11).

As shown in FIG. 7, a tumbler type key lock 66 is provided on the flange 23 on the longitudinal edge of cover 22 opposite the hinges and includes a vertical shaft 67 having an arm 68 thereon that is adapted to engage a cut-away notch 69 on the underside of a platform 21 to lock the cover in position. In order to prevent any vibration of the cover relative to the platform and firmly hold the cover in position on the platform, sash type locks 70 are provided at longitudinally spaced points (FIG. 3). As shown in FIGS. 6 and 9, sash type locks 70 are of conventional construction including a hook 71 fixed to the underside of flange 23 and adapted to be engaged by a rotatable cam type lock member 72 that is pivoted on a bracket 73 fixed to the underside of the platform 21.

In order to hold the cover 22 open when access is to be had to the interior of the luggage carier, a rod 75 having an eye 76 on the end thereof is engaged with a loop 77 fixed to the inside of the cover 22. The free end of the rod 75 engages an opening 78 in the upper surface of the platform 21 (FIG. 15) to hold the cover in open position. When not in use, the end of the rod 75 hooks behind a loop 80 on the inner surface of the cover 22.

It can thus be seen that there has been provided a car top carrier which can be readily mounted on and removed from the top of an automobile; which is water, weather and dirt proof; which is theft proof; which includes a removable cover; which is light in weight; and which can be manufactured at low cost.

We claim:

1. In a car top carrier, the combination comprising a substantially flat platform,
   a hollow cover hinged to said platform and adapted to be brought into position adjacent the top of said platform to provide a hollow luggage carrier,
   means comprising transversely extending hollow channels on the underside of said platform,
   a leg pivoted about a longitudinal axis to said channels adjacent each end of said channels,
   means on the lower end of each leg adapted to engage the car top,
   means for connecting said last-mentioned means to said car top,
   and extensible and contractible means interconnecting the lower ends of said pivoted legs,
   the underside of said channel having openings therein through which said extensible and contractible means extends,
   said openings being adjacent the ends of said channels whereby the major portion of said extensible and contractible means lies within said channel,
   said platform having an access opening therethrough,
   said means extensible and contractible including adjustable means which is accessible only through the interior of the luggage carrier through said access opening when the cover is opened.

2. The combination set forth in claim 1 wherein said extensible and contractible means includes a rod individual to each leg and pivotally connected at one end thereof to the lower end of each leg,
   the other ends of said rods being interconnected by said adjustable means.

3. The combination set forth in claim 2 wherein said means on each said leg adapted to engage the car top comprises a pad pivoted to each said leg about the axis of pivot of said one end of said rod to said leg.

4. The combination set forth in claim 1 wherein said adjustable means comprises
   a turnbuckle,
   means in each said channel engaging the respective turnbuckle and preventing movement of the turn buckle longitudinally of the channel.

References Cited in the file of this patent

UNITED STATES PATENTS

| | | |
|---|---|---|
| 2,222,636 | Strauss | Nov. 26, 1940 |
| 2,434,387 | Brandt | Jan. 13, 1948 |
| 2,597,656 | Martin | May 20, 1952 |
| 2,812,992 | Lysen | Nov. 12, 1957 |
| 2,833,453 | Barreca | May 6, 1958 |

FOREIGN PATENTS

| | | |
|---|---|---|
| 220,510 | Australia | Feb. 25, 1959 |